July 7, 1942.  C. H. VIEBROCK  2,288,981
AIR CONDITIONER
Filed Oct. 29, 1940  3 Sheets-Sheet 1
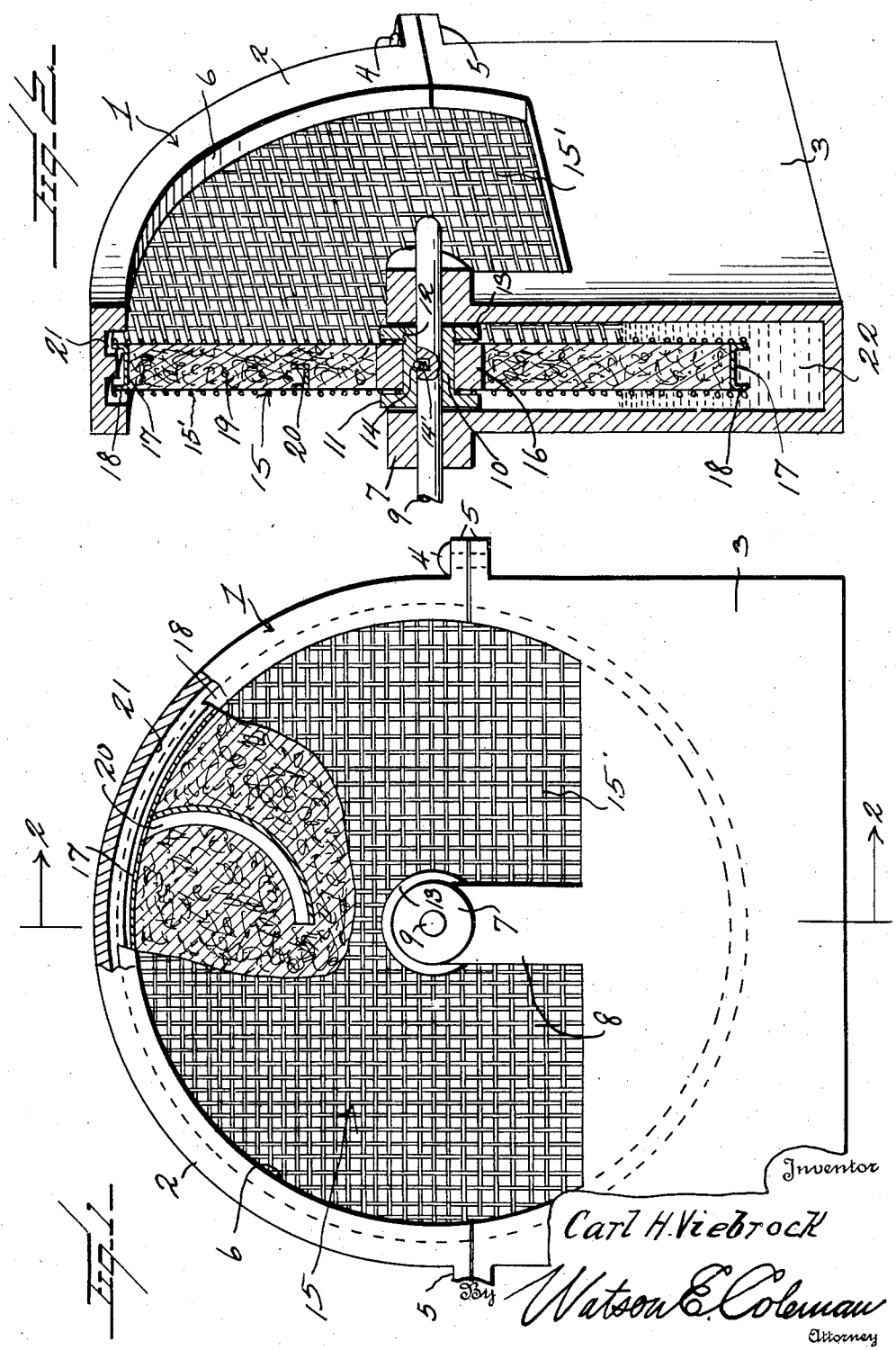
Inventor
Carl H. Viebrock
By Watson E. Coleman
Attorney

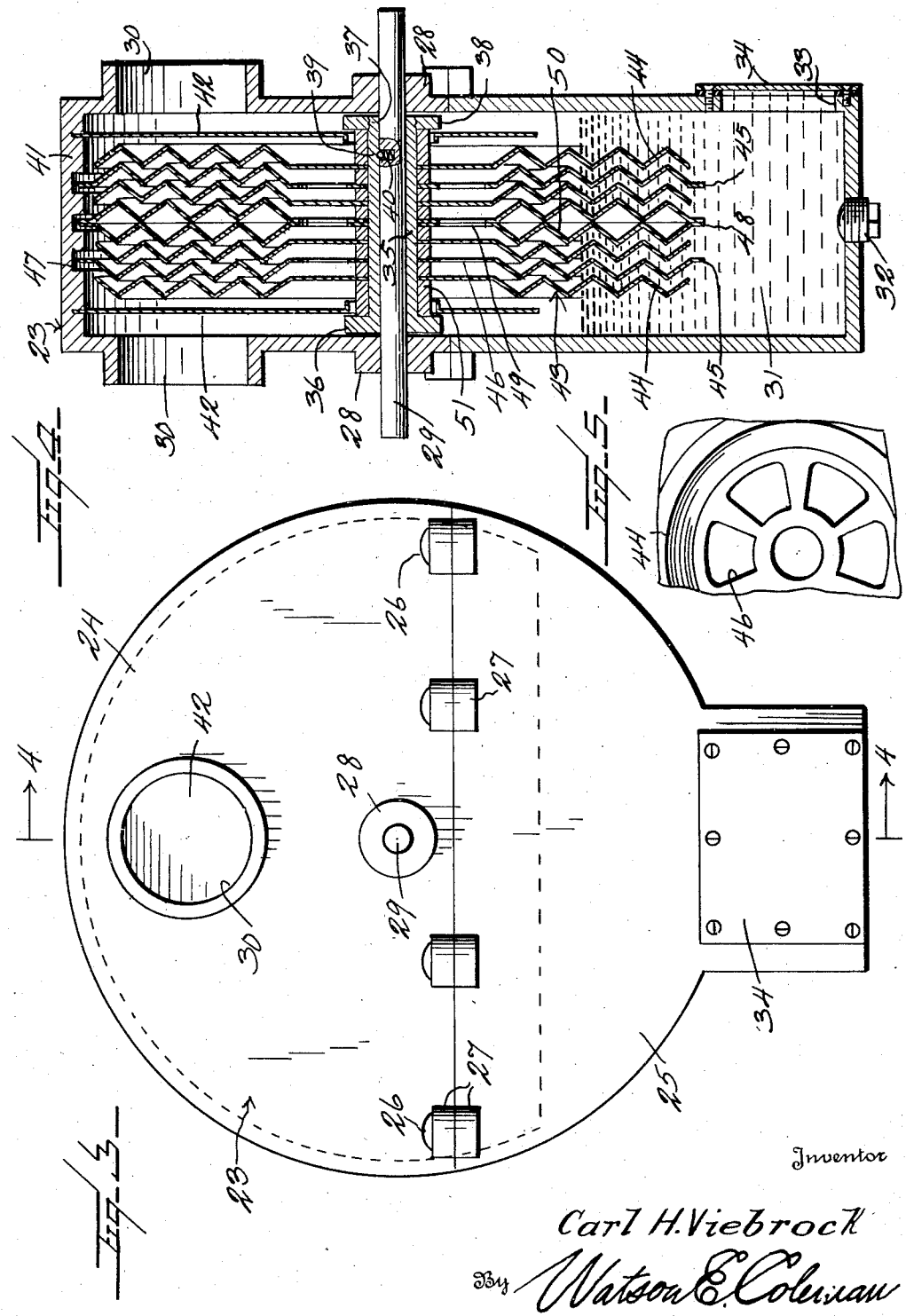
July 7, 1942.  C. H. VIEBROCK  2,288,981
AIR CONDITIONER
Filed Oct. 29, 1940  3 Sheets-Sheet 2
Inventor
Carl H. Viebrock
By Watson E. Coleman
Attorney

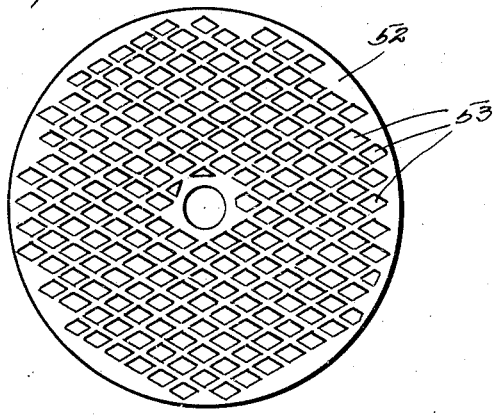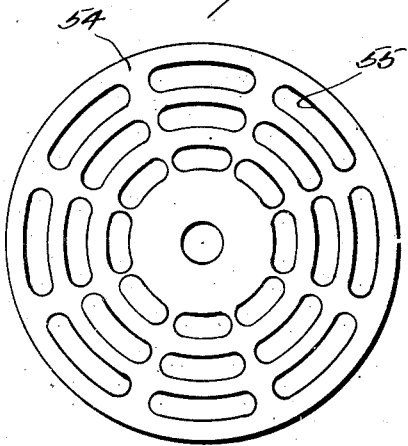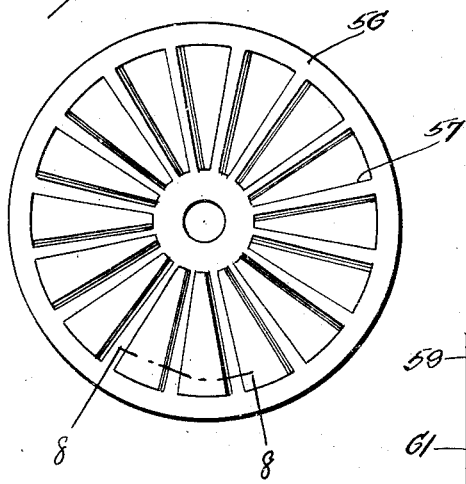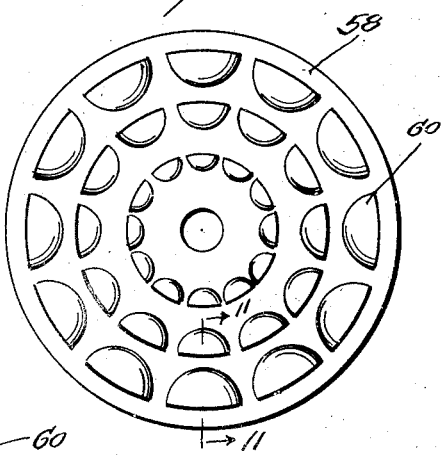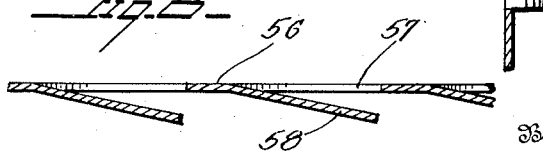

Patented July 7, 1942

2,288,981

UNITED STATES PATENT OFFICE 2,288,981

AIR CONDITIONER

Carl H. Viebrock, Douglas, Wash.

Application October 29, 1940, Serial No. 363,357

12 Claims. (Cl. 261—92)

The invention relates generally to improvements in devices for cleaning air and other fluids.

The present invention has for its primary object to provide a device which is designed primarily for cleaning air and other gases and which may also be employed for condensing steam, wherein the fluid in passing through the device is caused to contact rotary elements which effect the removal of dust or other material from the air or other fluid or which, if the device is used as a condenser, causes condensation to take place and the depositing of the condensate in a receiving receptacle.

Another object of the invention is to provide an air cleaner or conditioner wherein the air or other fluid is brought into contact with one or more rotating elements enclosed within a housing through which the fluid passes, the elements being partly immersed in oil, water or other suitable liquid whereby suspended particles in the air will adhere to the rotary element and will be washed off as the element turns through the liquid thereby thoroughly removing all suspended particles from the air or other gas passing through the housing.

A further and more specific object of the invention is to provide an air cleaner or conditioner in which a novel type of rotor body is employed, with which the air is brought into contact, whereby the air will be thoroughly agitated and washed for the removal of suspended matter therefrom.

Still another object of the invention is to provide an air conditioner or cleaner in which the air is caused to pass along a tortuous channel between rotating bodies so as to assure contact of all of the air with the rotating bodies before the air passes out of the housing in which the bodies are enclosed, thereby insuring the removal of all suspended particles from the air.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Figure 1 is a view in side elevation of one form of the air cleaner with a portion of the same broken away.

Figure 2 is a perspective view in vertical section taken on the line 2—2 of Figure 1.

Figure 3 is a view in side elevation of another form of the air cleaner.

Figure 4 is a vertical section in perspective taken on the line 4—4 of Figure 3.

Figure 5 is a fragmentary view showing the formation of the central portion of one of the disks.

Figure 6 illustrates a modified form of disk which may be employed in the device.

Figure 7 illustrates still another form of disk in which the apertures are bordered by outstruck vanes.

Figure 8 is a fragmentary section on the line 8—8 of Figure 7.

Figure 9 is a view in plan of still another form of disk in which the apertures are of arcuate form.

Figure 10 illustrates in plan still another form of disk in which a disk is pressed to provide a plurality of outstruck bells.

Figure 11 is a fragmentary section on the line 11—11 of Figure 10.

Referring now more particularly to the drawings, the numeral 1 generally designates one form of the present invention, which may be defined as the simplified form thereof. In this form of the invention the housing 1 comprises the upper and lower portions 2 and 3 respectively, which are secured together one upon the other by means of securing screws 4 passing through opposing lugs 5. Each of the two side walls of the housing is provided with an arcuate opening or window 6 at the radial center of which is located a bearing 7 supported upon the post 8. These bearings 7 are in alinement transversely of the housing and they have extended therethrough and support a shaft 9 with which any desired or suitable type of driving means (not shown) may be connected.

Upon the shaft 9 there is mounted a hub 10 which, at one end, is provided with the flange 11 while at its other end it is screw threaded, as indicated at 12, to receive the nut 13. The interior of the hub 10 is provided with a socket 14 for the reception of a spring pressed ball 14' carried by the shaft. This spring pressed ball forms a releasable coupling between the shaft and the hub which permits the shaft to be withdrawn so as to facilitate the removal from the shaft of the unit supported thereon.

Mounted upon the hub 10 is a rotor unit which is indicated as a whole by the numeral 15. This rotor comprises spaced disks 15' of foraminous form, the disks here shown being of reticulate material but it is to be understood that disks of any other character may be used so long as they are provided with suitable apertures or openings. These reticulate disks are secured in spaced parallel concentric relation between the flange and nut of the hub structure and a spacer ring 16 through which the hub passes. The peripheries of the disks are coupled together by the channeled annulus 17, the flanges 18 of which are directed radially.

Secured between the disks 15' is a fibrous material 19 of suitable character. This material may be held in a sufficiently loose mass to permit the flow of air therethrough.

There is also disposed between the disks 15' one or more arcuate liquid conducting channels 20 which, at one end, open through the annulus 17 between the flanges 18 thereof and at the other end open into the material 19 adjacent the hub. This channel 20 will pick up some of the fluid from the lower part 3 of the housing and conduct it inwardly toward the center of the mass of fibrous material 19 as the unit 15 rotates.

The inner wall of the upper portion 2 is curved concentric with the axle or shaft 9 and is provided with channels 21 in which the flanges 18 are located. The flanges position loosely in these channels. While some air will pass the edges of the disks, the location of the disk edges in the channels prevents the air from flowing straight through the housing without contacting moisture carrying surfaces.

The lower portion 3 of the housing is designed to contain a fluid such as oil, water or the like, this fluid being indicated by the numeral 22 and being at a depth sufficient to immerse a substantial part of the lower portion of the rotary body 15.

In the form of the invention described it will be readily seen that the fibrous material carrying rotor 15 when revolved will dip into the fluid 22 and that air passing from one opening 6 to the opposite opening will flow across the periphery of the rotor through the channels 21 and some of it will pass through the foraminous disks and the fibrous material and thus in contacting this material and the fluid coated surface of the annulus 17 any suspended particles which the air may be carrying will be extracted and the air will issue in clean condition.

Figures 3 and 4 designate another form of the air cleaning or conditioning device of the present invention. This form of the invention is indicated as a whole by the numeral 23 and comprises a housing which is horizontally divided into the upper and lower portions 24 and 25 respectively, such portions being secured together by screws or bolts 26 passing through alined lugs 27. The upper and lower portion 24 of the housing may be rectangular or semi-circular in form, the latter being here illustrated, and the side walls thereof are provided with the oppositely disposed alined bearings 28 through which extends a rotor supporting shaft 29. The side walls of the upper portion of the housing are also provided with ports for the entrance and exit of air, these ports being indicated by the numeral 30.

The lower portion 25 of the housing is designed to contain suitable cleansing or wash fluid, such as oil or water, indicated by the numeral 31, and for the removal of the fluid there is provided an outlet opening in the bottom of the lower portion of the housing which is closed by a plug 32. A side wall of the lower portion 25 has an inspection opening 33 therein which is covered by the plate 34.

Upon the shaft 29 which, like the shaft 9 of the first described form of the invention, is designed to be turned by any suitable power mechanism, there is mounted the hub 35 at one end of which is a flange 36, while the opposite end is screw threaded, as indicated at 37, to receive a nut 38. The hub 35 in its inner surface is provided with a notch 39 in which engages a spring pressed ball 40 which is carried by the shaft, this ball locking the shaft to the hub but permitting the removal of the shaft when desired.

Secured to the top wall 41 of the upper portion 24 of the housing and depending therefrom to a level a substantial distance below the shaft 29 are two baffle plates 42 each of which is in closely spaced relation with a side wall of the housing and covers an opening 30. These baffle plates are provided with suitable openings through which the hub and shaft extend so that the latter may rotate freely out of contact with the plates.

The shaft and hub support between the baffle plates 42, a rotor unit which is indicated as a whole by the numeral 43. This rotor unit comprises a series of centrally apertured disks 44 alternating with a series of centrally apertured disks 45, each of the latter disks also having a series of openings 46 therethrough around the central aperture thereof. The disks 45 are of greater diameter than the disks 44 and these disks of greatest diameter have their peripheries located in channels 47 in which the peripheries turn. These channels are formed as shown in Fig. 4, in the inner surface of the adjacent wall of the housing, the channels extending throughout this wall from one side of the lower portion of the housing in which the fluid is located, to the other side of this lower fluid containing portion.

The several disks making up the rotor unit 43 are circumferentially corrugated as illustrated.

In addition to the larger diameter disks 45 which alternate with the disks 44, there is a central division disk 48 of the same diameter as the disks 45, this central disk 48 also having a series of apertures 49 therethrough around the central opening with which it is provided. The central disk 48 is of double corrugated form so that on each side there are provided the outwardly projecting annular corrugation ribs 50 which extend into the annular recesses between annular corrugations of the adjacent disks 44 of smaller diameter.

The hub 35 extends through the central apertures of all of the disks and the disks are maintained in spaced relation on the hub by the spacer sleeves 51. These sleeves are pressed together to grip the disks therebetween and are pressed against the flange 36 of the hub by the nut 38, thus locking all of the disks securely into assembled relation.

While there has been shown in the form of the invention illustrated in Figures 3 and 4 disks of corrugated form, it is to be understood that the invention is not to be limited to this specific form of disk as flat disks may be used or disks having various types of openings therethrough.

In the form of the invention just described it will be readily apparent that air entering one of the openings 30 must first flow downwardly beneath the adjacent baffle plate or wall 42 and it will then come into contact with the first one of the disks 45 which is imperforate. The air will therefore have to rise to the top of the housing to pass over this imperforate disk 44 and then flow down along the inner side thereof between the same and a disk 45 to reach the apertures 46 of the second mentioned disk. Thus, the air will flow radially back and forth in the housing between the rotating disks, contacting the moistened surfaces thereof and leaving on such surfaces any particles which it may carry. These particles will be washed off as the disks dip into the wash fluid 31 in the lower part of the housing. Some of the air after passing under the first of the baffle plates 42 will rise to the top of the housing and will pass across the periphery of the rotor between the edges of the disks 45—48 and the channels 47 in which they turn. Thus, it will be seen that the air actually flows through the disks and across the peripheries thereof in passing through the housing from one opening 30 to the other.

While Figures 2 and 4 illustrate single units of the device it will be readily understood that a number of units may be coupled together for unitary operation when such an arrangement is considered feasible.

It will be noted that in Figures 1 and 2 the device is shown with disk members of screen or reticulate material for maintaining the fibrous strainer or filter material in position between them, whereas in the structure shown in Figure 4 the disks, as previously described, are provided with concentric annular corrugations and are apertured only near their centers.

Many other forms of disks may be employed in either the structure shown in Figure 2 or the structure shown in Figure 4 and a number of such disk forms which may be satisfactorily employed in the device is illustrated in Figures 6 to 10 inclusive.

These several hereinafter described disks when used in various combinations or assemblages in the structure of Fig. 4 prevent the establishment of a back pressure in the housing since they permit the air to flow through from the inlet to the outlet openings. They may be assembled in various combinations with the imperforate disks so that the air passing through the housing would be forced to flow to some extent radially and would be buffeted about in the housing in making its way through the apertures of the disk which, obviously, would be rotated at a substantial rate of speed. If all of the disks employed in a group in the housing should be perforated, then the disks would be rotated or made to revolve much faster than would the group shown in assembled Fig. 4. In any case, it will be readily apparent that the entering air would be directed toward the shaft 29 by the first deflector 42 and then would be forced to move radially by the rotation of the disks while at the same time passing through the apertures of the disks. Consequently since the disks would be carrying fluid over their surfaces, the air would be made to contact with such fluid to effect a transferral of moisture from the disks to the air and to effect the extraction from the air of dust or other particles of matter.

In Figure 6 there is shown a disk, which is indicated generally by the numeral 52, which, as shown, is of flat form and is provided with a plurality of apertures 53 which are here shown as being of diamond shape, although they may be of any other suitable shape. It is also to be made clear that while this disk is shown as being in the form of a flat plate it may also be pressed to have concentric annular corrugations like the disks 43. Another form of apertured disk here shown as being flat, although it may be corrugated, is shown in Figure 9 and indicated by the numeral 54. This disk is provided with a plurality of concentric annular groups of slots or apertures 55.

In Figure 7 another form of disk is shown and indicated by the numeral 56. In this form the body of the disk is pressed to produce a plurality of radially extending elongated openings 57 each of which is bordered by a fin 58 which lies in a plane oblique to the plane of the disk, as shown in Figure 8, thereby providing deflectors for air passing through the openings 57.

Figure 10 illustrates still another form of the disk which is indicated by the numeral 59. In this form, the disk is pressed to form upon one side face a plurality of bell-like hoods 60 each of which covers an opening 61 and each of which has its open side directed radially of the disk, as is clearly shown in Figure 11. These and many other types of disk forms may be used in the present device.

These disks when made of suitable material may function as conductors for heat or cold and when set up in the device may be employed in the process of condensing steam or other vaporized fluids in addition to being used in the device as means for effecting the cleansing of air or other gases. Disks such as are shown in Figures 6 to 10 inclusive, when in the arrangement of the disks 43 shown in Figure 4, will, of course, permit the air or other gas to pass directly through instead of requiring it to pass back and forth between the disks and across the peripheries thereof but it will, of course, be understood that the same form of casing will be employed as is shown in Figure 4. Also large and small disks or disks of different diameters, would be employed where the disks have the construction shown in any one of Figures 6 to 10.

The different designs of disks shown and described may be used in mixed formation or a group may be made up of disks having all one form or design, if desired. Obviously, if a group were made up entirely of disks of the form shown in Fig. 6 or entirely of disks of the form shown in Fig. 9, a more rapid rotation of the group would be employed than would be necessary if the group were made up of disks such as are shown in Figs. 7 and 10 where, due to the offset portions 58 and 60, respectively, the air passing through the apertures would have to follow a more tortuous pathway than would be the case in the use of the disks shown in Figs. 6 and 9.

By using a large number of these apertured disks a sufficient surface area for contact with the fluid passing through the device would be obtained so that a satisfactory condensing action might be secured where the condensing of steam is an object or use might be made of the disks for cooling or heating the air passing therethrough by warming or chilling the disks in a suitable manner as, for example, by having them dipped into a refrigerated or a heated fluid.

While in Figure 4 the disks are all illustrated as being free to rotate within the casing it is contemplated as being within the scope of the present invention to secure at their peripheries those disks of greater diameter and free them from the shaft so that certain of the disks may be held stationary while others such as alternate ones of the entire group will be free for rotation with the shaft.

In the use of the various forms of disk, particularly in the structures shown in Figs. 3 and 4, the baffles 42 may be removed if desired, so as to permit the air or other gas to pass directly against and through the various disks.

From the foregoing, it will be readily apparent that the devices herein described provide a simple and efficient means of performing various functions such as the cleansing of air or other gases, the condensing of steam or other vaporized fluids and for the regulation of the temperature of air in the manner described.

I claim:

1. A conditioner for air and other gases, comprising a housing having oppositely disposed inlet and outlet openings, a rotor body within the housing including at least two disk-like members supported in spaced relation for rotation in the housing, said members being disposed between said openings, the upper part of the housing having a channeled inner wall surface into which the peripheries of said disks extend and rotate, and a baffle means supported between and rotating with said disks through which the gases pass from one disk to the other.

2. A device for treating air and other gaseous fluids comprising a housing having opposed walls provided with inlet and outlet apertures, a rotor within the housing including at least two disk-like members disposed in coaxial relation, the peripheries of said members being in cooperative relation with a recessed portion of the top wall of the housing to form a narrow tortuous gas passageway across the periphery of the rotor, and a baffle disposed between and turning with the disk-like members.

3. A device for treating air and other gaseous fluids comprising a housing having opposed walls provided with inlet and outlet apertures, a rotor within the housing including at least two disk-like members disposed in coaxial relation, the peripheries of said members being in cooperative relation with a recessed portion of the top wall of the housing to form a narrow tortuous gas passageway across the periphery of the rotor, and a baffle disposed between and turning with the disk-like members, said disk-like members being of foraminous form.

4. A device for treating air and other gaseous fluids comprising a housing having opposed walls provided with inlet and outlet apertures, a rotor within the housing including at least two disk-like members disposed in coaxial relation, the peripheries of said members being in cooperative relation with a portion of the top wall of the housing to form a narrow gas passageway across the periphery of the rotor, and a baffle disposed between the disk-like members through which the fluid passes, said disk-like members being of foraminous form and said baffle comprising a fibrous material packed between the disk-like members.

5. A device for treating air and other gaseous fluids comprising a housing having opposed walls provided with inlet and outlet apertures, a rotor within the housing including at least two disk-like members disposed in coaxial relation, the peripheries of said members being in cooperative relation with a recessed portion of the top wall of the housing to form a narrow tortuous gas passageway across the periphery of the rotor, and a baffle disposed between and turning with the disk-like members, said baffle being in the form of a distorted disk disposed concentric with and between the disk-like members for checking the smooth flow of the fluids between the apertures.

6. A device for treating gaseous fluids comprising a housing having opposite walls provided with inlet and outlet openings, a rotary shaft extending transversely through said walls, a rotor supported upon the shaft within the housing and including a hub member having opposed end portions and a pair of disk-like bodies concentrically supported upon the hub, a fibrous material interposed between said disk-like bodies, said bodies of fibrous material being held in cooperative relation by and between the said end members of the hub, and said disk-like members having their peripheries disposed to move in channels formed in the encircling wall of the housing.

7. A device for treating gaseous fluids comprising a housing having opposite walls provided with inlet and outlet openings, a rotary shaft extending transversely through said walls, a rotor supported upon the shaft within the housing and including a hub member having opposed end portions and a pair of disk-like bodies concentrically supported upon the hub, a fibrous material interposed between said disk-like bodies, said bodies of fibrous material being held in cooperative relation by and between the said end members of the hub, and a channeled annular member disposed between the disk-like members at the peripheries of the same and connecting said peripheries together, the channel of the annular member being directed outwardly, the housing having a wall concentric with the upper part of the rotor and provided with channels in which the peripheries of the disk members and the adjacent portions of the channeled annulus move, said disk-like members being formed for the passage of gaseous fluids therethrough.

8. A device for treating gaseous fluids comprising a housing having opposite walls provided with inlet and outlet openings, a rotary shaft extending transversely through said walls, a rotor supported upon the shaft within the housing and including a hub member having opposed end portions and a pair of disk-like bodies concentrically supported upon the hub, a fibrous material interposed between said disk-like bodies, said bodies of fibrous material being held in cooperative relation by and between the said end members of the hub, and a channeled annular member disposed between the disk-like members at the peripheries of the same and connecting said peripheries together, the channel of the annular member being directed outwardly, the housing having a wall concentric with the upper part of the rotor and provided with channels in which the peripheries of the disk members and the adjacent portions of the channeled annulus move, said disk-like members being formed for the passage of gaseous fluids therethrough, said housing being designed to contain a liquid through which the lower part of the rotor moves, and a channel forming means extending from and opening through said annular member toward the center of the rotor body for conducting fluid inwardly from the periphery of the rotor.

9. A device of the character stated for treating air and other gaseous fluids comprising a housing having opposite walls provided with inlet and outlet openings, a rotary shaft extending transversely through the housing through said walls, imperforate baffle plates disposed within the housing across and in close proximity to each wall opening and extending downwardly below said shaft, a plurality of disk-like members concentrically supported in spaced relation upon and rotated by the shaft, alternate ones of the disk-like members having apertures therethrough adjacent their centers and the said apertured members being of greater diameter than the remaining disk-like members and each having its periphery disposed within a channel formed in a top wall of the housing, which top wall is curved concentrically with the disks, the disks of smaller diameter being slightly spaced from said top wall for the passage of gaseous fluid across their peripheries.

10. A device of the character described for treating air and other gaseous fluids, comprising a housing having opposite walls provided with inlet and outlet openings, a shaft rotatably supported in and extending transversely of the housing between said walls, a hub supported on the shaft in the housing and having a flange at one end and a nut threaded upon the other end, a plurality of collars on said hub between the nut and flange, a plurality of disks supported in concentric relation on the hub and spaced apart by said collars, alternate ones of said disks being of greater diameter than the others, the disks of greater diameter having apertures therethrough adjacent their centers and having their peripheral portions disposed in channels formed in the adjacent wall of the housing, the disks of smaller diameter being slightly spaced at their peripheries from the said adjacent wall of the housing, and fixed baffle members disposed upon opposite sides of the plurality of disks and each overlying a wall opening and extending downwardly from said top wall below said shaft.

11. A device of the character described for treating air and other gaseous fluids, comprising a housing having opposite walls provided with inlet and outlet openings, a shaft rotatably supported in and extending transversely of the housing between said walls, a hub supported on the shaft in the housing and having a flange at one end and a nut threaded upon the other end, a plurality of collars on said hub between the nut and flange, a plurality of disks supported in concentric relation on the hub and spaced apart by said collars, alternate ones of said disks being of greater diameter than the others, the disks of greater diameter having apertures therethrough adjacent their centers and having their peripheral portions disposed in channels formed in the adjacent wall of the housing, the disks of smaller diameter being slightly spaced at their peripheries from the said adjacent wall of the housing, and fixed baffle members disposed upon opposite sides of the plurality of disks and each overlying a wall opening and extending downwardly from said top wall below said shaft, said disks being formed to have annular corrugations and the corrugations of the several disks being in intermeshing relation.

12. A device as set forth in claim 3 in which said baffle is spaced from the recessed top wall.

CARL H. VIEBROCK.